(12) United States Patent
Itoh (10) Patent No.: US 8,997,106 B2
(45) Date of Patent: Mar. 31, 2015

(54) METHOD OF USING TICKETS AND USE COST VALUES TO PERMIT USAGE OF A DEVICE BY A PROCESS

(75) Inventor: Hiroshi Itoh, Sagamihara (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 1545 days.

(21) Appl. No.: 12/266,634

(22) Filed: Nov. 7, 2008

(65) Prior Publication Data

US 2009/0133020 A1 May 21, 2009

(30) Foreign Application Priority Data

Nov. 21, 2007 (JP) ................................. 2007-302144

(51) Int. Cl.
*G06F 9/50* (2006.01)
*G06F 9/48* (2006.01)

(52) U.S. Cl.
CPC ............ *G06F 9/4881* (2013.01); *G06F 9/5094* (2013.01); *G06F 9/5005* (2013.01)
USPC .......................................... 718/104; 713/320

(58) Field of Classification Search
None
See application file for complete search history.

(56) References Cited

U.S. PATENT DOCUMENTS

| | | | | |
|---|---|---|---|---|
| 5,596,576 A * | 1/1997 | Milito | ............................ | 370/450 |
| 5,958,058 A * | 9/1999 | Barrus | ............................ | 713/320 |
| 5,987,492 A * | 11/1999 | Yue | ................................ | 718/102 |
| 6,148,408 A * | 11/2000 | Shimoda | ....................... | 713/320 |
| 6,587,865 B1 * | 7/2003 | Kimbrel et al. | ............... | 718/104 |
| 7,353,414 B2 * | 4/2008 | Chrysos | ........................ | 713/320 |
| 2004/0054857 A1 * | 3/2004 | Nowshadi | ...................... | 711/153 |
| 2004/0215988 A1 * | 10/2004 | Clabes et al. | .................. | 713/300 |
| 2006/0179439 A1 * | 8/2006 | Jones et al. | .................... | 718/105 |
| 2008/0005603 A1 * | 1/2008 | Buch et al. | ..................... | 713/320 |
| 2008/0072231 A1 * | 3/2008 | Yoshida | ........................ | 718/104 |
| 2008/0244607 A1 * | 10/2008 | Rysin et al. | .................... | 718/104 |
| 2009/0049449 A1 * | 2/2009 | Varadarajan | .................. | 718/104 |
| 2010/0185882 A1 * | 7/2010 | Arnold et al. | ................. | 713/320 |

FOREIGN PATENT DOCUMENTS

| | | |
|---|---|---|
| JP | 07-175669 | 7/1995 |
| JP | 11-212809 | 8/1999 |
| JP | 2002-230246 | 8/2002 |
| JP | 2003-330579 | 11/2003 |
| JP | 2005-339335 | 12/2005 |
| JP | 2006-031400 | 2/2006 |
| JP | 2007-179437 | 7/2007 |

* cited by examiner

*Primary Examiner* — Keith Vicary
(74) *Attorney, Agent, or Firm* — Antony P. Ng; Russell Ng PLLC (57) ABSTRACT

A method for managing the usage of hardware resources by application programs within a computer system is disclosed. A use cost value is set for a device within a computer system. A number of tickets associated with a process is held. Upon execution of the process, the use cost value is compared to the number of tickets held by the process. The process is permitted to use the device based on the result of the comparison.

12 Claims, 9 Drawing Sheets

| AUCTION LIMIT | LUMINANCE | LOW | MEDIUM | HIGH |
|---|---|---|---|---|
| | PERFORMANCE COST | 100 | 300 | 500 |
| SUPERIOR GROUP | INFINITY | | | |
| ORDINARY GROUP | 300 | | | |
| INFERIOR GROUP | 100 | | | |

METHOD OF USING TICKETS AND USE COST VALUES TO PERMIT USAGE OF A DEVICE BY A PROCESS

PRIORITY CLAIM

The present application claims benefit of priority under 35 U.S.C. §§120, 365 to the previously filed Japanese Patent Application No. JP2007-302144 entitled, "Computer system and method of managing device for process" with a priority date of Nov. 21, 2007, which is incorporated by reference herein.

BACKGROUND OF THE INVENTION

1. Technical Field

The present invention relates to computer hardware resource management in general, and in particular to a method for managing the usage of hardware resources by application programs within a computer system.

2. Description of Related Art

A multi-tasking operating system (OS), such as Windows®, UNIX®, etc., executes a set of tasks or processes while switching every time slice. Application programs use hardware resources, such as a memory, a bus, a hard drive, a display and so on, to perform certain tasks.

One prior art discloses a technique in which license information, which is information for permitting the usage of resources such as data transfer bandwidth and the like, is given to applications, limitation information indicating a limitation to the amount of use is given to the resources, and when there is a request to use a resource from the applications, it is determined whether or not the usage of the resource is permitted based on the license information and the limitation information. If the usage of resource is permitted, a license to the resource with the defined term of validity is given to the applications and the license information is updated based on the quantity of the license. According to this technique, each of the applications using resources can use a resource license according to the license information and the limitation information if the resource is currently available without performing a process depending on resource limitations or need of resources by other applications.

Another prior art discloses a method for attaining proportional processor resource sharing between a set of processes. A certain number of tickets is allocated to each process, and a process priority is computed based on the allocated number of tickets. An OS fetches and executes an execution-waiting thread out of a dispatch queue. Every time a thread is executed, the number of tickets decreases and the initial number of tickets is again allocated when the number of tickets becomes equal to zero. As a result, multiple threads are executed by a processor at a time, and the number of threads is proportional to the respective allocated number of tickets. This method can provide fair ticket allocation since the amount of processor resources to execute the processes can be controlled by the number of tickets.

SUMMARY OF THE INVENTION

In accordance with a preferred embodiment of the present invention, a use cost value is set for a device within a computer system. A number of tickets associated with a process is held. Upon execution of the process, the use cost value is compared to the number of tickets held by the process. The process is permitted to use the device based on the result of the comparison.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Introduction

Figure 1A:
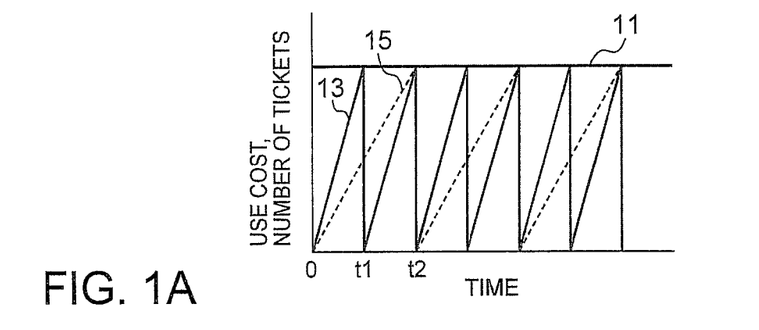
FIGS. 1A-1C explain the principle of device management for application execution, in accordance with a preferred embodiment of the present invention.
Figure 1B:
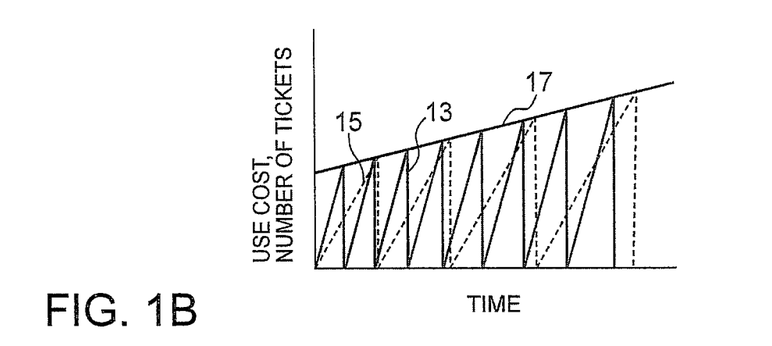
Figure 1C:
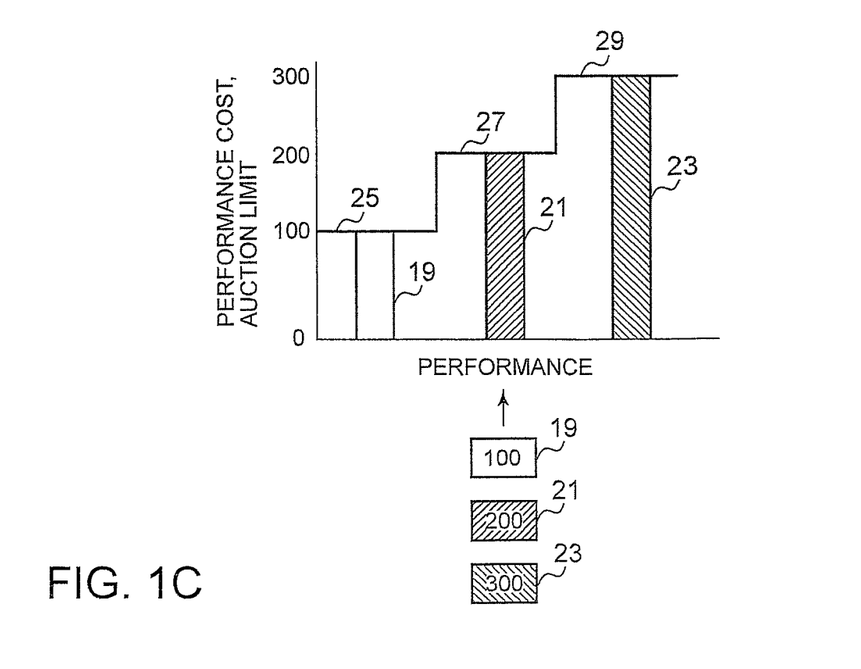

FIG. 1 explains the principle of device management for application execution according to a preferred embodiment of the present invention. An application refers to an independent program having a particular purpose for a user, such as a spreadsheet, a word processor, etc. When an application is being executed in a computer system, an operating system (OS) creates a process to execute the application. A process, which is also referred to as a task, is the minimal program unit operating on the OS. More specifically, a process corresponds to a job such as search, print, file output, etc. in case of a word processor. A processor is executed in subdivided units of program execution, which are called threads. In this specification, the unit of program executed by a processor is represented by a process.

A process is executed by a processor to implement the object of an application by using various devices of a computer system. The usage of a device by a process means that the process accesses the device during execution of the process and the accessed device performs an operation. In a multi-tasking OS, since multiple processes are executed with respective allocated time slices, it may be said that the processes are not simultaneously executed and devices accessed by the processes are also not simultaneously used.

Here, the concept, "use of device," to be controlled in this embodiment will be described. The usage of a device equipped in a computer system has two viewpoints, possession use and time division use. "Possession use" refers to a state in which a set of processes uses a portion of a memory space of a main memory or an auxiliary storage simultaneously while dominating a certain period of time. A position or range to possess a certain amount of memory space is controlled between processes. A bandwidth of a data bus may be included in this category since it is simultaneously possessed by data generated in the processes.

To the contrary, "time division use" refers to a state where processes use a device such as a processor or a display device in a time-division manner. The possession state and the time division state are definition methods based on a method of use of a device by a process, and may or may not be divided by every device. For example, an auxiliary storage is a device type that uses both possession use and time division use. A device of the time division use type is changed in operation time and power consumption when a frequency of time division is changed.

In the present disclosure, although a management method to permit or inhibit use of a time division use type device is described, an application of this method to management of a possession range of a possession use type device is not excluded. In the present disclosure, metaphors, which are referred to as "number of tickets" and "auction limit," are introduced for processes, and metaphors, which are referred to as "use cost" and "performance cost," are introduced for a device. The number of tickets is a parameter to determine a frequency of access of a process to a device. An auction limit is a parameter to determine performance of a device usable by a process. A use cost is a parameter to determine a use frequency of a device for a process possessing a certain number of tickets. A performance cost is a parameter to performance of a device provided to a process possessing a certain auction limit. These metaphors may have other names as long as they represent parameters of equal property on the basis of the spirit of the present invention.

Environmental information is a factor affecting a use cost and a performance cost set for a device and is quantified data related to a certain use purpose of a computer system. The environmental information may be a primary factor representing a natural state such as temperature, humidity or the like or may be an artificial secondary or third factor generated by machining the primary factor by a computer system. The environmental information may be varied during operation time of a computer system or may be constant during the operation time and varied during the next operation time after stoppage of the computer system. The environmental information may be generated within the computer system or may be received from the outside of the computer system via a network.

II. Management of Time-Division Use of a Device

In the present disclosure, when a new process is generated within a computer system, the process possesses the number of tickets which varies on a time axis. For example, the number of tickets increases with lapse of time, is updated when the process uses a device, and thereafter increases again in an iterative manner. The increase rate per unit time may be set to different values for different processes. In more detail, a computer system gives the unit number of tickets to each process every unit time. The given unit number of tickets are accumulated and each process possesses the accumulated unit number of tickets as the current number of tickets. As one example, the unit number of tickets is set to the same value for all processes, and unit time is set to different values for different processes. As another example, the unit time is set to the same value for all processes, and the unit number of tickets is set to different values for different processes.

In either case, the number of tickets per unit time given every process may be set to different values. In addition, a use cost is set for each device of a computer system. A process may use a device when the process possesses the current number of tickets which is more than a use cost of the device. If the current number of tickets is insufficient, there is a need to wait until the process additionally receives the unit number of tickets every certain unit time and the number of tickets becomes sufficient. When the process uses the device, the current number of tickets may be subtracted by a certain number of consumed tickets or may be reset to zero. Thereafter, the unit number of tickets is given at an equal rate as long as the process exists. The set increase rate of the number of tickets per unit time may not be permanently fixed on the time axis, but may be changed based on the environmental information.

FIG. 1A shows a state where a process 13 and a process 15 having different increase rates of the number of tickets per unit time employ a time division use type device, with a use cost 11 of the device set to be constant on the time axis. In this example, on the time axis, the number of tickets of the process 13 increases at a speed which is twice as high as the number of tickets of the process 15. In other words, the process 13 takes half the time for the same number of tickets, as compared to the process 15.

Although the timing at which a process uses a device is varied according to a control state of a scheduler of OS, FIG. 1A shows that the current number of tickets becomes equal to the use cost at time t1 in the process 13, the current number of tickets becomes equal to the use cost at time t2 in the process 15, and the processes 13 and 15 use their respective devices. When each process uses the corresponding device, the current number of tickets is reset, and thereafter, the number of tickets increases at an equal rate as long as the process exists. When the processes 13 and 15 use the respective devices, a certain number of consumed tickets may be subtracted from the current number of tickets.

In the event of the resetting, the process 13 always acquires twice a use frequency with respect to a device of the use cost 11 from the process 15 on the time axis. However, in the event of the subtraction, the next use frequency is varied according to the previous use state of the device. For example, if the process 15 possesses a number of tickets without using a device for a long time in the past, the process 15 may thereafter use the device at a use frequency higher than that of the process 13. Accordingly, it is preferable to determine whether the number of tickets is reset or subtracted by determining respective characteristics according to the type of applications and management methods of devices, which are introduced in every computer system.

FIG. 1B shows a state where the process 13 and the process 15 use the devices when a use cost 17 is varied with time based on environmental information. In this example, the use cost 17 linearly increases on the time axis depending on the environmental information. In FIG. 1A, the use frequency of devices between the processes could be controlled by the rate of the current number of tickets increasing with time. However, in a computer system, it cannot be said that the use frequency of devices can be optimized by only control based on superiority and inferiority between the processes. For example, in case of a portable computer, available time is determined by the remaining capacity of a battery. In this case, the amount of available time to be left in the portable computer cannot be determined by control based on superiority and inferiority between the processes. This is because the usage of a device at a high frequency by a superior process excludes a view point of control of the remaining available time.

On the other hand, it may be contemplated that an access frequency is limited for all processes when the remaining capacity of the battery becomes insufficient. In this case, although control of the available time is considered, a view point of superiority and inferiority between the processes is excluded. A preferred control of a computer system when the battery remaining capacity becomes insufficient is to cause a certain process to use a device preferentially while causing all processes to cooperate with each other in order to lengthen the remaining available time. In this case, there is a need to perform compact control such as causing any process not to use a device, causing a particular process not to use a device, or limiting time for which a process is caused not to use a device.

In FIG. 1B, the battery remaining capacity is employed as the environmental information, the use cost of the devices increases with decrease of the battery remaining capacity, and the unit number of tickets is given to any of the process 13 and the process 15 with the same conditions as FIG. 1A. Although any process has a use frequency of the devices decreasing with lapse of time, it can be understood that the process 13 uses the corresponding device at a frequency which is twice as high as the process 15, like FIG. 1A. When an infinite number of tickets is given to the process 13, an effect of the environmental information may be completely excluded. In addition, when the increase rate of the use cost (a gradient of the use cost 17) for the battery remaining capacity is changed, it is possible to properly set an antinomic state, i.e., a contradictory relation between a comfort index when a user executes applications and remaining available time by battery driving.

III. Management of Device Performance

The method of controlling the use frequency of devices by processes via changing the use cost and the number of tickets on the time axis has been previously illustrated using FIGS. 1A and 1B. Now, a method of selecting device performance using a performance cost and an auction limit will be described with reference to FIG. 1C. The performance cost is a parameter corresponding to the use cost and the auction limit is a parameter corresponding to the number of tickets. Some devices may be recognized to have the same function and different performances by a computer. For example, in a display device, a device driver can set any different luminance for a controller. Accordingly, a computer system recognizes the display device as multiple devices having different luminance performances.

In case of a display device, although a comfort index of a user increases with increase of luminance, power consumption is increased and battery operation time is shortened. Therefore, a higher performance cost is set for a display device having higher luminance. FIG. 1C shows a state where each of three processes 19, 21 and 23 selects one of a high luminance display device 29, a medium luminance display device 27 and a low luminance display device 25 whose performance is classified with luminance. A computer system sets 300, 200 and 100 as performance costs for the display devices 29, 27 and 25, respectively.

The computer system gives 100, 200 and 300, as auction limits, to the processes 19, 21 and 23, respectively. Then, when each of the processes 19, 21 and 23 selects a display device to be permitted to be used, the process presents its own auction limit to the display device. Then, the process receives permission to use the display with the maximum performance cost set below the auction limit. For example, the process 23 can use all of the display devices 25, 27 and 29 since it possesses the auction limit of 300, the process 21 can use the display devices 25 and 27, and the process 19 can use only the display device 25.

An auction limit possessed by a process and a performance cost set for a device can be varied according to environmental information during operation of a computer system. For example, when the battery remaining capacity is lowered, if auction limits of all of the processes 19, 21 and 23 are set to 100, any process can be caused to use only the display device 25. As another example, if the performance cost of the display device 27 is increased to 300, the process 19 and the process 21 are caused to use only the display device 25.

IV. Hardware Configuration of a Notebook PC

Figure 2:
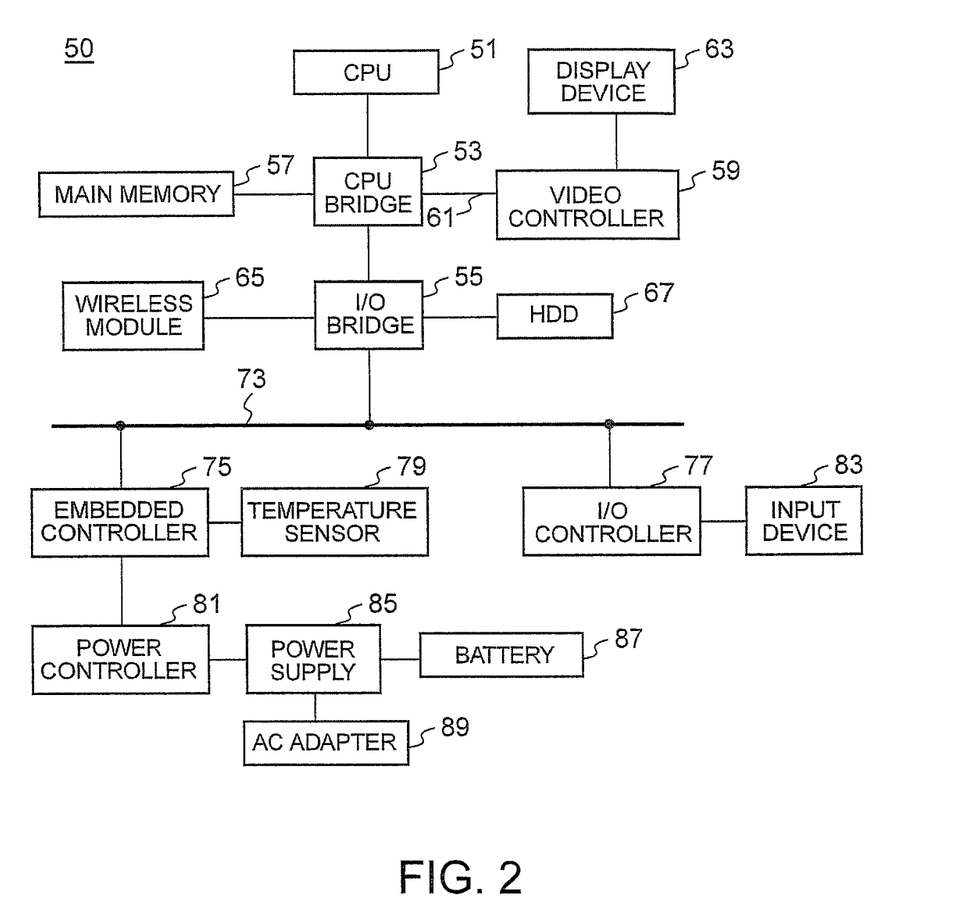
FIG. 2 is a block diagram of a notebook PC.

FIG. 2 is a block diagram of a notebook personal computer (PC) 50 according to a preferred embodiment of the present invention. A central processing unit (CPU) 51 is a processor responsible for the central function of notebook PC 50, and executes an OS, a BIOS, a device driver, application programs, etc. The CPU 51 also executes a ticket/cost manager 102 and intermediate drivers 105a to 105c (shown in FIG. 3) according to the present embodiment. The CPU 51 controls devices coupled, via various buses, to chip sets configured around a CPU bridge 53 and an input/output (I/O) bridge 55. The CPU 51 has a so-called "slot ring" function to lower a time frequency to a predetetinined time frequency or lower a voltage. The CPU bridge 53 includes a memory controller function to control an access to a main memory 57, a data buffer function to absorb a difference in data transfer speed between the CPU 51 and other devices, etc.

Figure 3:
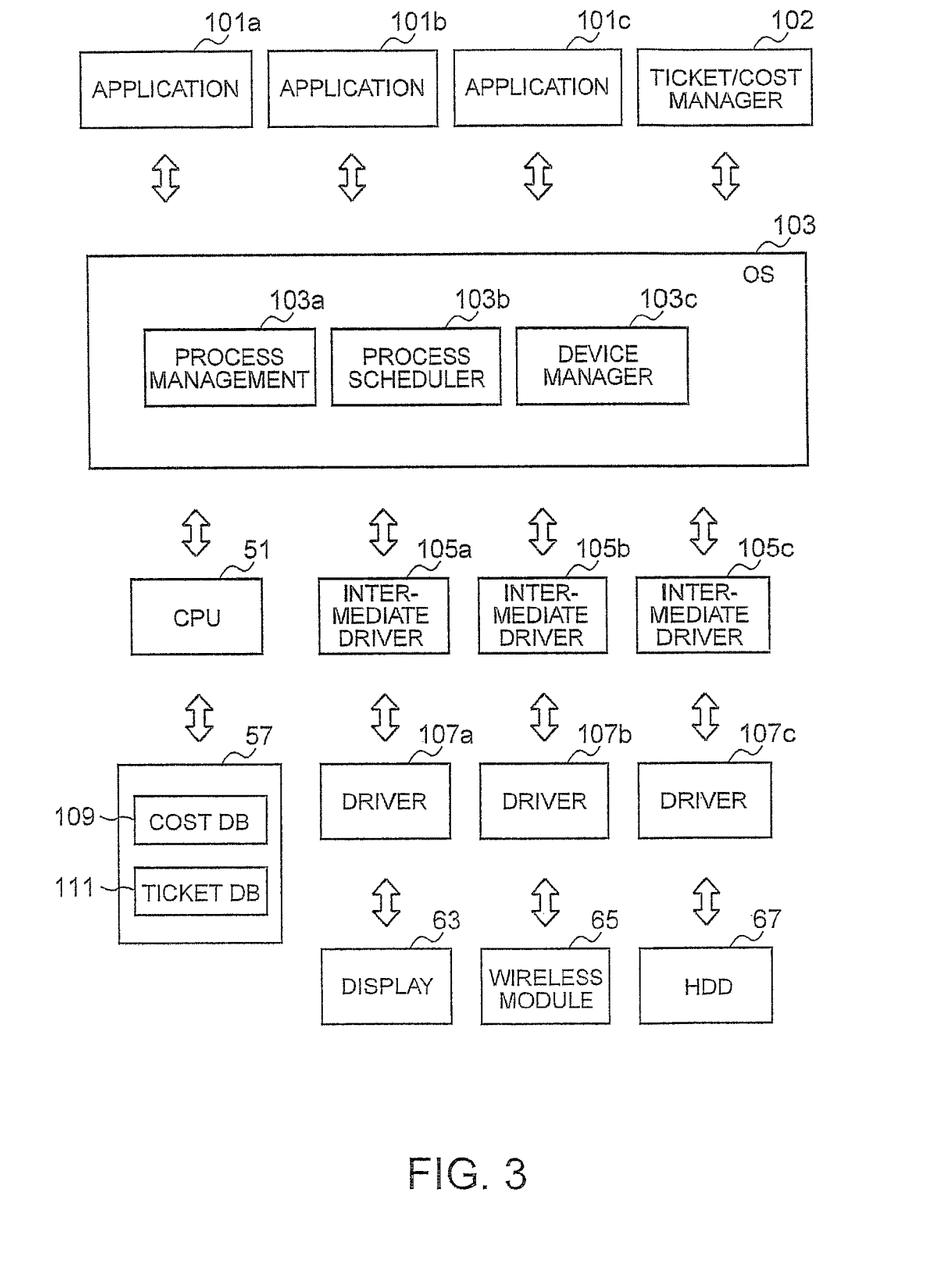
FIG. 3 is a block diagram illustrating a relationship between software and hardware equipped in a notebook PC.

The main memory 57 is coupled to the CPU 51 via a Double Data Rate (DDR) bus. The main memory 57 is a writable memory used as a read area for a program executed by the CPU 51 and a work area into which processed data are written. A cost database 109 and a ticket database 111 as shown in FIG. 3 are constructed in the main memory 57 according to generation of a process. A video controller 59 is coupled to the CPU 51 via a PCI Express X16 bus 61. The video controller 59 is equipped with a video chip and a VRAM (not shown). The video controller 59 generates an image to be drawn according to a drawing instruction received from the CPU 51, writes the generated image into the VRAM, and sends an image read from the VRAM, as drawing data, to a liquid crystal display 63. The liquid crystal display 63 is configured such that a driver can set luminance in several phases based on a signal from the CPU 51.

The video controller 59 is equipped with a graphic accelerator and a driver can set the graphic accelerator to be valid or invalid based on a signal from the CPU 51. When the graphic accelerator is set to be valid, data can be transmitted from the main memory 57 to the VRAM for display of an image having high resolution, without passing though the CPU 51.

A wireless module 65 is suitable for multi-input multi-output (MIMO) wireless communication based on IEEE 802.11n, for example. The wireless module 65 is coupled to the I/O bridge 55 via a PCI Express X1 bus and conducts data communication with a wireless network via an antenna. The I/O bridge 55 also functions as a serial ATA interface and a USB interface and is coupled to a hard disk drive (HDD) 67, an optical drive (not shown), etc. via a serial ATA. In addition, the I/O bridge 55 is coupled to a legacy device, which is a device corresponding to old standards conventionally used in notebook PCs, or a device which does not require a high speed data transfer via PCI bus or LPC bus 73.

An LPC bus 73 is coupled with an embedded controller 75, an I/O controller 77, and further a BIOS-ROM (not shown) storing a BIOS used to start a system. The embedded controller 75 is a microcomputer configured by an 8 to 16-bit CPU, a ROM, a RAM and so on and includes A/D input terminals, D/A output terminals, a timer and digital input/output terminals of a plurality of channels. The embedded controller 75 is coupled with a cooling fan (not shown), a temperature sensor 79, a power controller 81 to control a power supply, etc. via its input/output terminals and can execute a program related to management of operation environments within the notebook PC, independent of the CPU 51. The temperature sensor 79 measures temperature inside a housing of the notebook PC 50 and outputs an analog voltage corresponding to the measured temperature to the A/D input terminal of the embedded controller 75. The I/O controller 77 is coupled with an input device 83 such as a keyboard, a mouse and the like.

The embedded controller 75 controls the number of rotations of the cooling fan based on the temperature inside the housing and controls an operation frequency of the CPU 51. The embedded controller 75 and the power controller 81 are interconnected via a Serial Peripheral Interface (SPI) which is a dedicated bus. The power controller 81 is coupled with a power supply 85.

The power supply 85 includes an AC-DC converter for converting direct power, which is supplied from an AC adapter 89 or a battery 87, into a plurality of voltages which is required to operate the notebook PC 50 and is supplied to devices. The AC adapter 89 is detachably coupled to the notebook PC 50. The power supply 85 further includes a charger. When the AC adapter 89 is coupled to the notebook PC 50, the battery is charged by the charger. The battery 87 is constituted by an intelligent battery pack including a CPU therein and sends data of remaining capacity to the embedded controller 75 regularly.

FIG. 2 shows a simplified configuration and connection relationship of main hardware only for the purpose of illustrating this embodiment. In addition to those described in the above, many devices may be used to configure the notebook PC 50, but since the devices are known in the art, detailed explanation of which will be omitted. It is to be understood by those skilled in the art that several blocks shown in FIG. 2 may be incorporated into one integrated circuit or device or one block may be divided into several integrated circuit or device without departing from the spirit and scope of the invention. In addition, the kinds of buses, interface and so on providing connection between the devices are only by way of examples, and it is to be understood by those skilled in the art that other connections may be provided without departing from the spirit and scope of the invention.

V. Software Configuration of a Notebook PC

FIG. 3 is a block diagram for explaining a relationship between software and hardware equipped in the notebook PC 50. An OS 103 is a preemptive multitasking OS such as Windows®, Linux®, UNIX® or the like. Known applications 101a, 101b and 101c operate on the OS 103. In FIG. 3, elements except for a ticket/cost manager 102, intermediate drivers 105a, 105b and 105c, a cost database 109 and a ticket database 111 are known in the art. The intermediate drivers 105a, 105b and 105c are equipped in the OS 103 and operate when the CPU 51 is in a privilege mode.

The ticket/cost manager 102 is a program to manage and hold information such as the unit number of tickets, auction limits, use costs, performance costs and so on. The ticket/cost manager 102 constructs the cost database 109 and the ticket database 111 in the main memory 57. The ticket/cost manager 102 records the current number of tickets, which is produced by accumulating the unit number of tickets, and a corresponding processor identifier with the ticket database 111. The ticket/cost manager 102 stores an auction limit corresponding to the processor identifier in the ticket database 111.

The ticket/cost manager 102 stores a device identifier and information of a use cost and a performance cost in the cost database 109. In addition, the ticket/cost manager 102 can update the cost database 109 by changing the use cost, the performance cost and the auction limit according to environmental information.

The OS 103 includes known process management 103a, process scheduler 103b and device manager 103c in its kernel. FIG. 3 shows the CPU 51, the main memory 57, the display, the wireless module 65 and the HDD 67 as representative devices. Device drivers 107a, 107b and 107c are dedicated programs to operate corresponding devices. The intermediate drivers 105a, 105b and 105c operate between the device drivers 107a, 107b and 107c and the OS 103.

The intermediate drivers 105a, 105b and 105c monitors all accesses to the devices by a process executed in the CPU 51, determines whether or not a corresponding device is available by referring to the cost database 109 and the ticket database 111, and informs the CPU 51 of a result of the determination. If the corresponding device is used by the process, the intermediate drivers update the ticket database 111 by subtracting a certain number of consumed tickets from the current number of tickets registered with the ticket database 111 or resetting the current number of tickets. The intermediate drivers 105a, 105b and 105c may request the ticket/cost manager 102 to update the ticket database 111 or may directly update the ticket database 111 using appropriate semaphore.

VI. Process

Figure 4A:
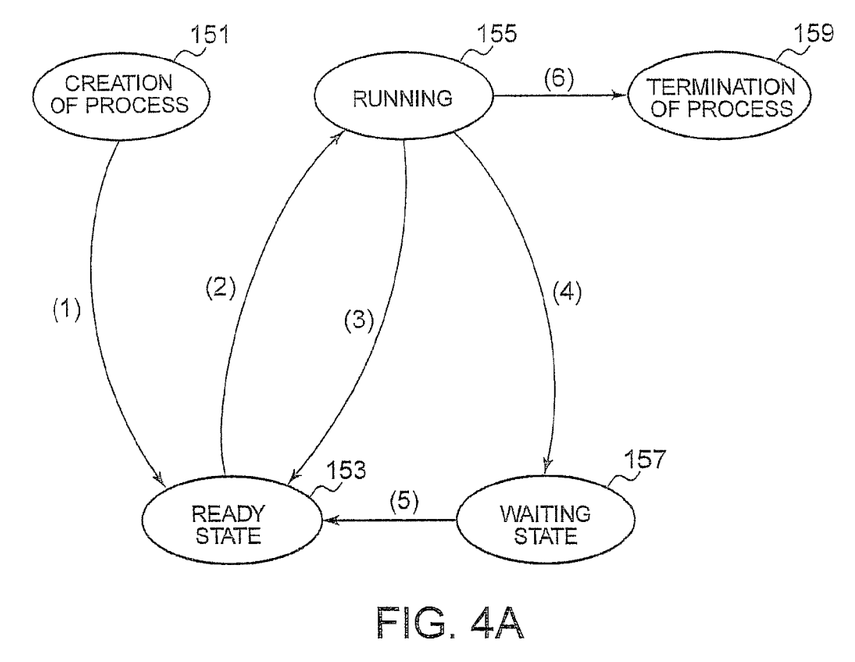
FIGS. 4A-4B show process state transition and a PCB data structure.
Figure 4B:
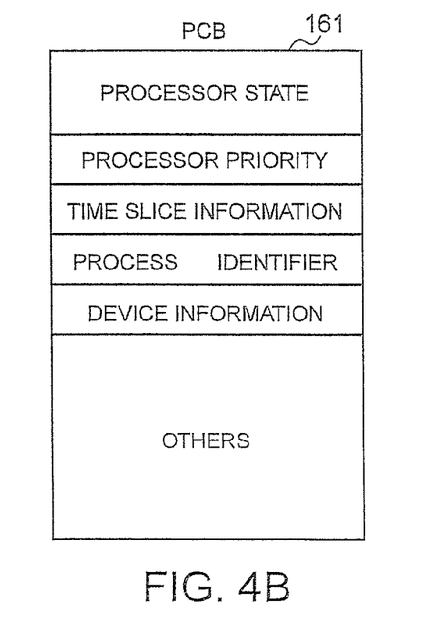

FIG. 4A is a state diagram showing process state generated for the applications 101a, 101b and 101c operating under the multitasking OS 103. FIG. 4B shows a data structure of a process control block (PCB) showing each process state. When one of the applications is executed, the process management 103a of the OS creates a process by allocating a required device to the process. The process is basically in one of states including Process Creation 151, Ready State 153, Running 155, Waiting State 157 and Process Termination 159.

The process is configured by a program under execution and information indicating the state of the CPU 51 and the OS manages the process as a data structure which is referred to as PCB 161. In the PCB 161, a processor state, which is also referred to as context, is information on states of registers, stacks, program counters and so on when the CPU 51 stops the process. Priority of the process is information indicating priority of a context switch between processes.

Time slice information refers to information on an initial value or remaining time of a time slice. A time slice refers to maximum execution time allowed when a process acquires one execution right for the CPU. A process identifier is a number allocated to each process. Device information is identification information of a device allocated to a corresponding process. A variety of other information is included in the PCB 161 according to the OS.

The PCB 161 of the process created by the OS 103 goes into the Running State 153 when the PCB 161 is registered with an executable queue secured in a data area of the OS 103 (Transition 1). A number of processes created for the same application or different applications is registered with the executable queue. The process scheduler 103b performs a context switch by transitioning a process between Running State 155 and Ready State 153 according to a certain scheduling algorithm including process priority (Transition 2 and Transition 3). Transition of a process from Ready State 153 to Running State 155 is referred to as dispatch and may employ a variety of algorithms. When a time slice given to a process under execution expires, the process scheduler 103b performing a preemptive multitask forcedly seizes the execution right of the CPU 51 for the process, registers the seized execution right with the executable queue, and transitions another process to Running State 155.

Upon determining that a device required for execution of the process is in an unusable state due to disconnection or default of the device, the process went into Running State 155 transitions into Waiting State 157 (Transition 4), and the OS 103 registers the PCB 161 with an execution waiting queue secured in the data area of the OS. When a device allocated to the process registered with the execution waiting queue becomes available, the device interrupts in the CPU 51 by way of the OS 103 and informs the process management 103*a* of the fact, and the process management 103*a* transitions the process from Waiting State 157 to Ready State 153 and registers the PCB 161 with the executable queue. Thereafter, the process is transitioned into Running State 155 based on an algorithm of the process scheduler 103*b* and is executed in the CPU 51. When the process executed in the CPU 51 is ended, the process management 103*a* transitions the process to Process Termination 159 (Transition 6).

VII. Sequence of Device Used by a Process

Figure 5:
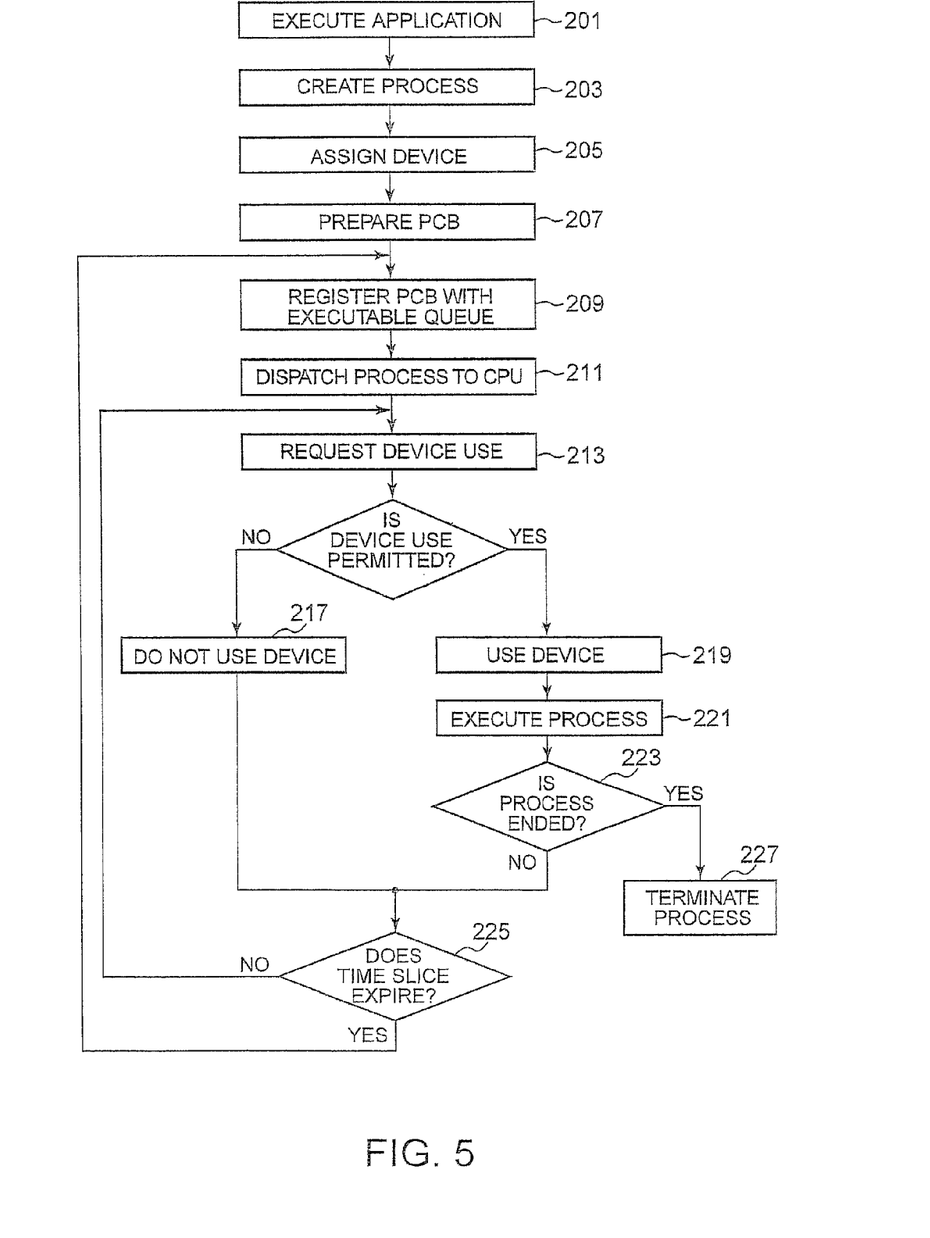
FIG. 5 is a high-level logic flow diagram illustrating a sequence when applications use a hard drive in a notebook PC.

FIG. 5 is a high-level flow diagram illustrating a sequence when the application 101*a* uses the HDD 67 in the notebook PC 50. When the application 101*a* is executed in Block 201, the process management 103*a* generates a process X in Block 203. Since the process X needs to use the HDD 67 in its execution, the process management 103*a* allocates the HDD 67 to the process X in Block 205. The process management 103*a* prepares the PCB 161 of the process X in Block 207 and registers the prepared PCB 161 with the executable queue in Block 209. The PCB 161 includes an identifier of the process X and an identifier of the HDD 67.

The process scheduler 103*b* performs a context switch between Ready State 153 and Running State 155 for the process X and other processes registered with the executable queue, based on a predetermined scheduling algorithm. When it comes a sequence to dispatch the process X, the process scheduler 103*b* transitions the process X to Running State 155 in Block 211. The CPU 51 starts to execute the process by reading the PCB 161 of the process X from a memory or reflecting the PCB 161 in a register or a stack. In Block 213, the process X requests the device driver 107*c* that the process X uses the HDD 67.

The intermediate driver 105*c* monitors all information on access to the HDD 67 requested from the process X and determines whether or not the process X is permitted to use the HDD 67. Details of this determination will be described in detail later with reference to a flow chart of FIG. 6. If the intermediate driver 105*c* does not permit the process X to use the HDD 67, the flow proceeds to Block 217. If the intermediate driver 105*c* permits the process X to use the HDD 67, the flow proceeds to Block 219 where the process X can use the HDD 67, and the process X is executed in Block 221.

In Block 223, the process management 103*a* determines whether or not the process X is ended. If the process X is ended, the flow proceeds to Block 227 where the process X is transitioned to Process Termination 159 to terminate the process X. At this point, the PCB 161 of the process X is terminated. If the process X is not ended and is not permitted to use the HDD 67, the process scheduler 103*b* determines in Block 225 whether or not a time slice for this process X is ended. If the time slice is not ended, the flow returns to Block 213. If the time slice is ended, flow returns to Block 209 where the process scheduler 103*b* registers the PCB 161 of the process X with the executable queue and dispatches another process to the CPU 51. When flow proceeds from Block 217 to Block 213, since the process X can not use the HDD 67, the time slice is wastefully consumed.

VIII. Sequence of Permission to Use a Device

Figure 6:
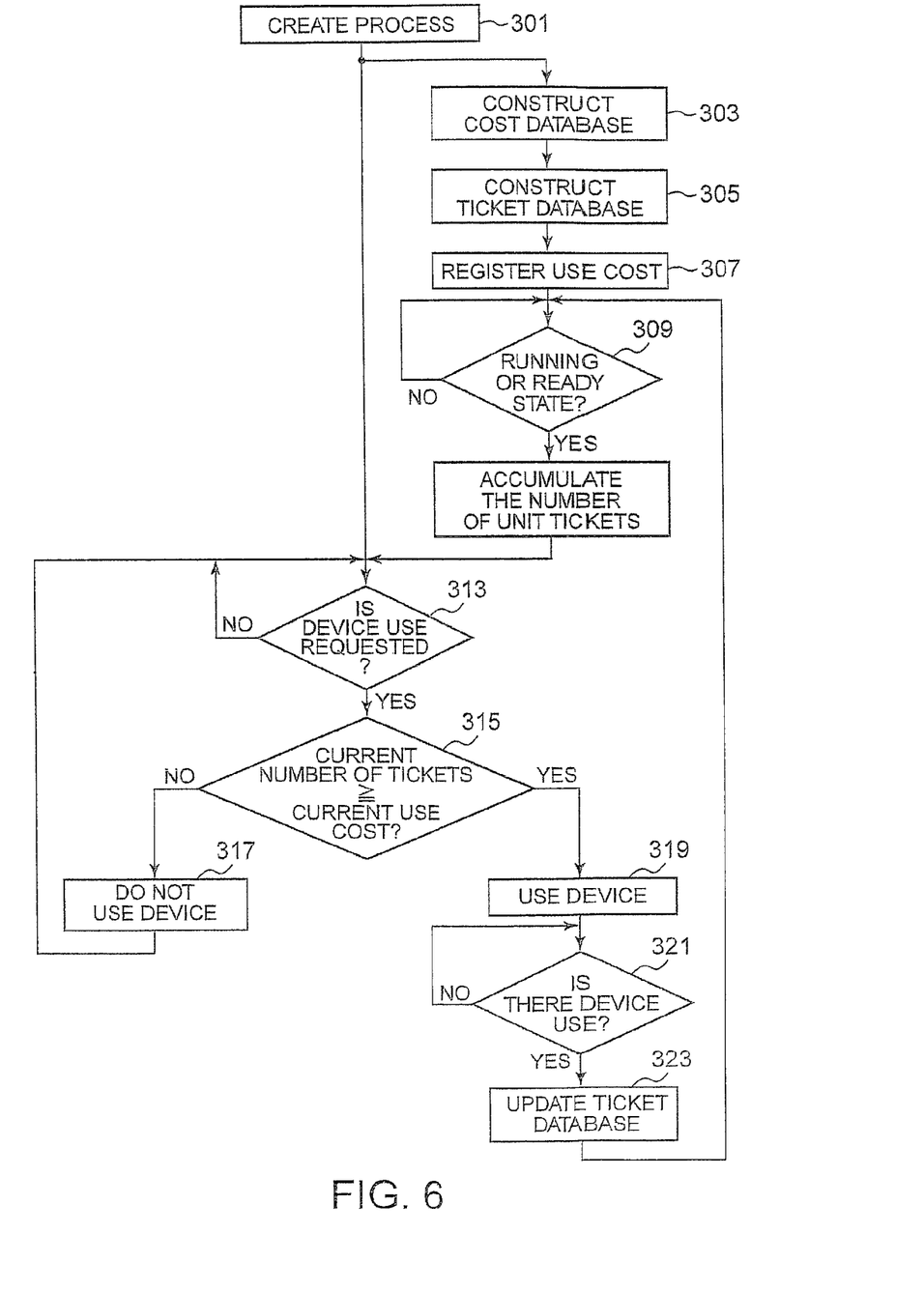
FIG. 6 is a high-level logic flow diagram illustrating a sequence of determination on whether or not a process is permitted to use a hard drive.

FIG. 6 is a high-level flow diagram illustrating a sequence to determine whether or not a process is permitted to use a HDD 67. In Block 301 corresponding to Block 203 of FIG. 5, the process management 103*a* generates a process X. In Blocks 303 and 305, the ticket/cost manager 102 informed of the generation of the process X by the process management 103*a* constructs and initializes the cost database 109 and the ticket database 111 in the main memory 57. In the cost database 109 and the ticket database 111, if the process X is terminated, the ticket/cost manager 102 abandons information related to the process X. An identifier and the current number of tickets produced by accumulating the unit number of tickets for each process are stored in the ticket database 111.

The ticket/cost manager 102 divides applications equipped in the notebook PC 50 into a superior group, an ordinary group and an inferior group and can equalize the unit number of tickets per unit time for processes of applications included in the same group. In addition, as one example, the ticket/cost manager 102 can give the infinite number of tickets to processes of the superior group, give the unit number of tickets of 100 every 100 ms for processes of the ordinary group, and give the unit number of tickets of 100 every 200 ms for processes of the inferior group. As another example, the ticket/cost manager 102 can give the unit number of tickets of 100 every 50 ms for processes of the ordinary group, and give the unit number of tickets of 100 every 100 ms for processes of the inferior group.

The superior group may include a system process, a network stack, EXPLORER, and other applications. The ordinary group may include office applications such as, for example, Word Processor, Spread Sheet, Electronic Mail Client and the like, and all undefined applications. The superior group may include background service applications such as, for example, Virus Check, Defragmentation and the like.

An identifier and the current use cost for each device are registered with the cost database 109. The current use cost means that an initially set use cost may be changed with lapse of time depending on environmental information. If the initially set use cost is not changed later, it becomes the current use cost. The initially set use cost may be set in such a manner that it becomes larger for a device having more power consumption.

In Block 307, the ticket/cost manager 102 registers an initial use cost with the cost database 109, as the current use cost, for the HDD 67 registered with the device manager 103*c*. The ticket/cost manager 102 can change a use cost for each device on the time axis based on environmental information. For example, when the embedded controller 75 acquires the remaining capacity of the battery 87 as environmental information and the remaining capacity is lowered, the ticket/cost manager 102 can increase a use cost of a certain device so much, thereby lowering an average use frequency of the device for all processes. Accordingly, the current use cost may be either a preset constant value held by the ticket/cost manager 102 or a value changed during operation of the notebook PC 50 according to environmental information. In case where the current use cost is a constant value, a use cost at the point when it is registered with the cost database 109 becomes the current use cost.

In Block 309, the ticket/cost manager 102 determines whether the process X is currently in Running State 155 or in Ready State 153, based on the information obtained from the process management 103a. If the process X is in one of the two states, the ticket/cost manager 102 accumulates the unit number of tickets regularly and stores the current number of tickets in the ticket database 111. If the process X is in none of the two states, the unit number of tickets is not given. Accordingly, when the process X is in Waiting State 157, the unit number of tickets is not given.

In Block 313 corresponding to Block 213 of FIG. 5, the process X in Running State 155 requests the device driver 107c that the process X uses the HDD 67. The intermediate driver 105c always monitors access of each process to the HDD 67, and if the process X accesses the HDD 67, refers to the cost database 109 and the ticket database 111 for the current use cost and the current number of ticket for the process X, respectively.

In Block 315, the intermediate driver 105c compares the current use cost with the current number of tickets. If the current number of tickets is larger than the current use cost, the process X is permitted to use the HDD 67 in Block 319. If the current number of tickets is smaller than the current use cost, the process X is inhibited from using the HDD 67 in Block 317. States in Blocks 319 and 317 are reflected in Blocks 219 and 217 of FIG. 5. If the process X uses the HDD 67 in Block 321, the intermediate driver 105c updates the ticket database 111 by subtracting the number of consumed tickets from the current number of tickets for the process X of the ticket database 111 in Block 323.

The intermediate driver 105c may reset the current number of tickets to zero instead of subtracting the number of consumed tickets. In case of subtracting the number of consumed tickets, a process taking a long time until the process is dispatched by the process scheduler 103a can be given with a number of unit tickets in the while and can use a device at a higher frequency later. In case of resetting the current number of tickets, the process uses the device at a certain frequency defined by the unit number of tickets given on the time axis and the given unit time.

If the process X is inhibited from using the device in Block 317, the process X is not substantially executed during its time slice. When the time slice expires, the process X is registered with the execution waiting queue. When the process X is dispatched to the CPU 51, the flow returns to Block 313 where the process X requests use of the HDD 67. If the current number of tickets becomes larger than the current use cost, the flow can proceed to Block 319.

IX. Number of Tickets and Circumstance of Device Use

Figure 7A:
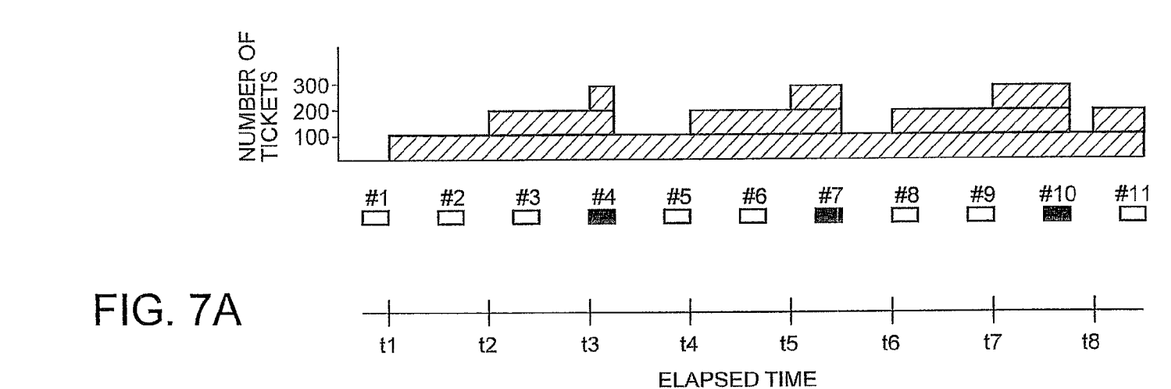
FIGS. 7A-7B explain a state when a process uses a hard drive.
Figure 7B:
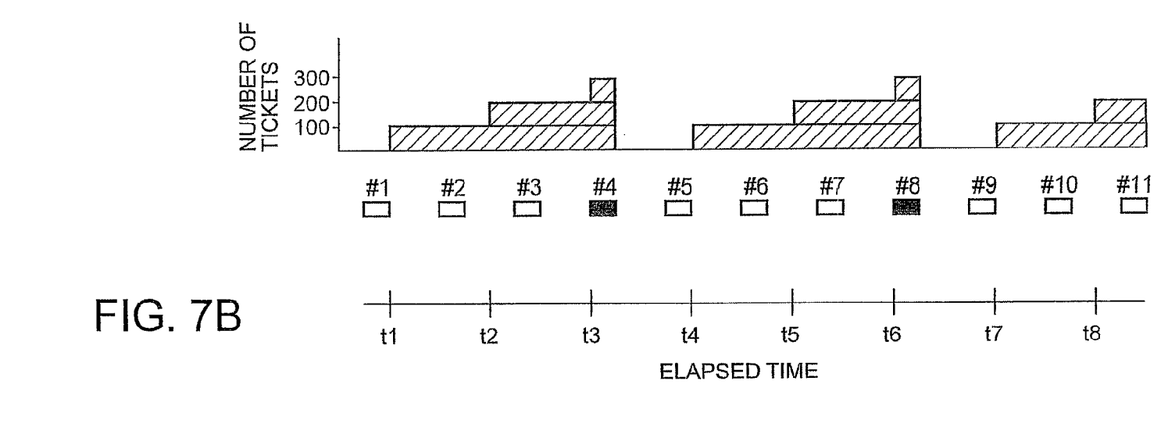

FIGS. 7A and 7B explain a state when the process X uses the HDD 67 in the sequence of FIGS. 5 and 6. In both FIGS. 7A and 7B, it is assumed that a use cost of the HDD 67 is 300 and the process X is given with the unit number of tickets of 100 per unit time. The unit time refers to an interval between each time t1, t2, ..., t8 and another adjacent time. FIG. 7A shows an example where 200 consumed tickets are subtracted from the current number of tickets when the process X uses the HDD 67, and FIG. 7B shows an example where the current number of tickets is reset to zero when the process X uses the HDD 67.

In FIG. 7A, the process X is given with the unit number of tickets of 100 every time t1, t2, t3, ..., t8. Time slices #1 to #11 indicate positions of time at which the process X is executed by the process scheduler 103b. Since the current number of tickets stored in the ticket database 111 is 200 immediately before time t3, which does not reach a use cost of 300, the process X can not use the HDD 67 at time slices #1 to #3. Since the current number of tickets increases to 300 at time t3, which reaches the use cost of 300, the process X can use the HDD 67 at time slice #4.

At time t4, as the number of consumed tickets of 200 is subtracted from the current number of tickets in the ticket database 111, the current number of tickets becomes 100. At time t5, as the current number of tickets becomes 300, the process X uses the HDD 67 at time slice #7 at which the process X is dispatched. Thereafter, likewise, as accumulation of the unit number of tickets and subtraction of the number of consumed tickets are carried out, the process X can use the HDD 67 at time slice #10.

In FIG. 7B, like FIG. 7A, when the process X is executed at time slice #4 at time t3, the current number of tickets is reset to zero. Likewise, as accumulation of the unit number of tickets and subtraction of the number of consumed tickets are carried out, the process X can use the HDD 67 at time slice #8.

X. Sequence of Selection of Device Performance

Figure 8:
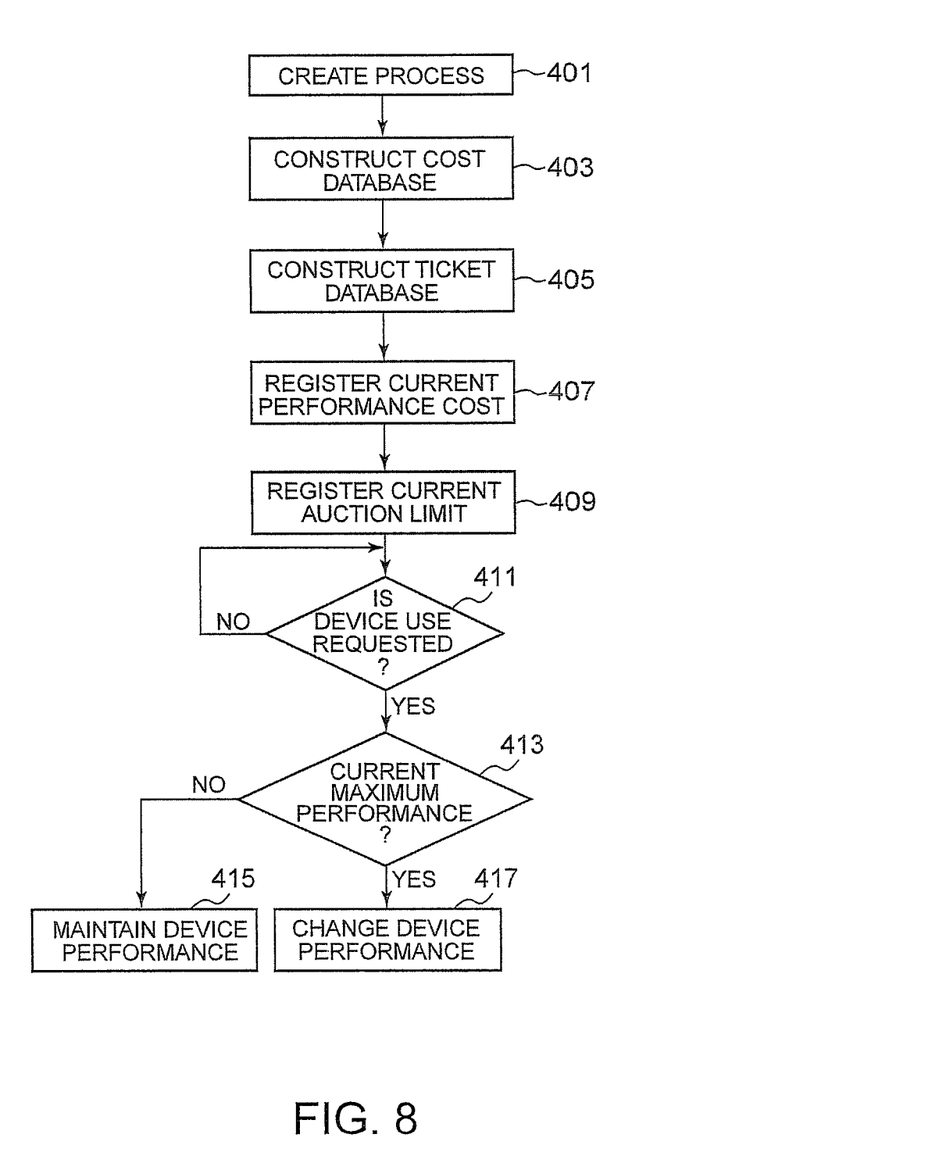
FIG. 8 is a high-level logic flow diagram illustrating a sequence when performance of a display device is selected in a notebook PC.

FIG. 8 is a high-level flow diagram illustrating a sequence when performance of the display device 63 is selected in the notebook PC 50. FIG. 8 corresponds to the sequence of determining the device used in Block 219 of FIG. 5. In Block 401, a process X is generated. In Blocks 403 and 405, the ticket/cost manager 102 informed of the generation of the process X by the process management 103a constructs and initializes the cost database 109 and the ticket database 111 in the main memory 57.

In Block 407, the ticket/cost manager 102 registers an initial performance cost with the cost database 109, as the current performance cost, for a device of the notebook PC 50 which is registered with the device manager 103c. In Block 409, the ticket/cost manager 102 registers an initial auction limit, as a current auction limit, with the ticket database 111 for the process X. The current performance cost and the current auction limit mean that an initial performance cost and an initial auction limit may be changed by the ticket/cost manager 102 with lapse of time based on environmental information.

Figure 9:
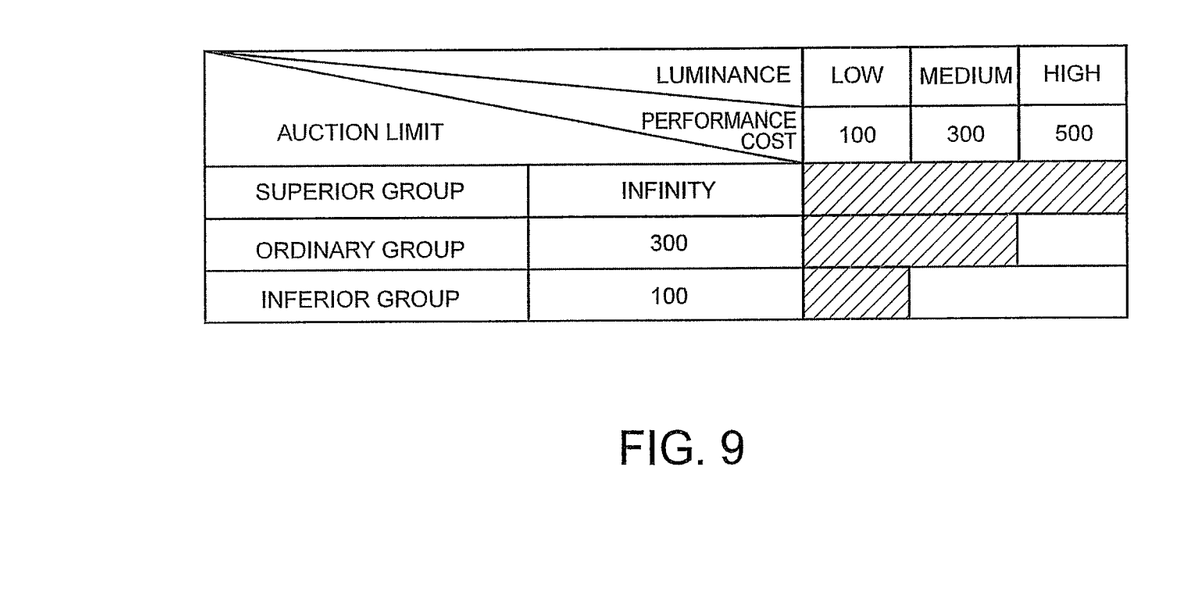
FIG. 9 shows an example of performance cost and auction limit.

FIG. 9 shows an example of current performance cost and current auction limit of the display 63. In FIG. 9, luminance is divided into three levels, i.e., low, medium and high, to which performance costs of 100, 300 and 500 are set, respectively. All processes are identified to fall within one of three groups, i.e., the superior group, the ordinary group and the inferior group. An infinite auction limit is given to processes of the superior group, an auction limit of 300 is given to processes of the ordinary group, and an auction limit of 100 is given to processes of the inferior group.

The processes of the inferior group correspond to applications which do not damage a comfort index of a user as possible when the notebook PC 50 is operated in a power saving mode, and can use only a display device having low luminance. The processes of the superior group can use any display device 63 having high, medium and low luminance. The processes of the ordinary group can use any display device 63 having medium and low luminance.

The ticket/cost manager 102 can change both or one of the current performance cost and the current auction limit on the time axis according to environmental information. As one example, when the battery remaining capacity is lowered, an auction limit given to the processes of the superior group and the ordinary group are also set to 100 so that all processes use only the display device 63 having low luminance. As another example, the performance cost of the display device 63 having medium luminance is changed to 500 so that the processes of the ordinary group use the display device 63 having low luminance.

In Block 411, the process X moves to Running State 155 and requests the device driver 107a that the process X uses the display device 63. In Block 413, the intermediate driver 105a compares the current auction limit of the process X with the current performance cost set in the display device 63 and selects the display device 63 having luminance having the highest performance cost below the auction limit. However, the intermediate driver 105a may select a display device 63 having different luminance having a performance cost below the auction limit. The intermediate driver 105a determines whether or not the display device 63 having the newly selected luminance has the maximum performance, including the display device 63 currently being used in other processes.

If it is determined that the display device 63 having the newly selected luminance, has the maximum performance, including the display device 63 currently being used in other processes, the process proceeds to Block 417 where the device driver 107a causes the display device 63 having the newly selected luminance to be used in any process. If it is determined that the display device having the newly selected luminance does not have the maximum performance, the flow proceeds to Block 415 where the device driver 105a maintains the previously set luminance without employing the newly selected performance.

Accordingly, since the intermediate driver 105a changes the luminance setting of the device driver 107a only when luminance higher than the luminance set up to the time is selected, it is possible to avoid a state where luminance is frequently changed by change of the executed processes. The determination in Block 413 is applied to only a device in which it is not preferable that its performance is changed by change of the processes, but is not necessary for all devices.

As a device having a plurality of performances, there is a graphic device making an accelerator valid or invalid in addition to a display device having changeable luminance. In this case, a case where the accelerator is made valid by setting of the device driver may be set to performance high and performance medium, and a case where the accelerator is made invalid may be set to performance low. In addition, a case where the rotation speed of the HDD in the absence of access is made high may be set to performance high and performance medium, and a case where the rotation speed is made low may be set to performance low. By setting a performance cost depending on such a performance level, it is possible to harmonize available time for battery driving with a comfort index of application execution in the notebook PC 50.

XI. Applications

It has been illustrated in the above that metaphors such as the use cost, the number of tickets, the performance cost and the auction limit, and further the battery remaining capacity as the environmental information are employed to manage devices and control the remaining available time. The device management method of the present invention can overcome various problems that cannot be solved by conventional device management methods for processes.

The temperature inside the housing of the notebook PC 50, which is detected by the temperature sensor 79, can be used as the environmental information. When the temperature inside the housing increases and exceeds the threshold temperature, the notebook PC 50 can lower a frequency of the CPU 51 or luminance of the display device 63. Such a state lowers a level of service of devices and is contradictory to a comfort index of a user. If the temperature inside the housing exceeds the threshold temperature, since a control has a hysteresis property, it takes a certain time to return to an original state and accordingly a use comfort index of a user is deteriorated in the while.

Accordingly, when the temperature inside the housing increases, by reducing an average frequency of access to a device for all processes such that the temperature does not exceed the threshold temperature, it is possible to put the device in a proper state while trading off a discomfort index by lowering of the access frequency and a discomfort index when the temperature exceeds the threshold temperature. In addition, even when the housing temperature increases, it is possible to prevent the access frequency from being lowered for processes belonging to the superior group.

An enterprise having a plurality of computer systems may perform peak cut of power in a certain time zone in the summer season for the purpose of saving power costs and restraining investment in power facilities. In this case, power consumption of the enterprise and a time zone of peak cut requested by an electric power company are employed as environmental information, and a use cost of a device having high power consumption is increased in a time zone requiring peak cut. As a result, by reducing an average access frequency of all processes without lowering an access frequency of a special process, it is possible to save power of individual computer systems.

In case when the environmental information is provided from the outside, a degree of reflection of the same environmental information in a use cost and a performance cost may be different between computer systems. For example, under circumstances with a plurality of computer systems, when use costs of important computer systems are not increased even in a time zone of peak cut while increasing use costs of ordinary computer systems, it is possible to manage power of the overall computer systems while closely controlling situations of superiority and inferiority between a plurality of processes in individual computer systems and situations between the plurality of computer systems.

A wireless LAN has a limited bandwidth (transfer rate) of wireless communication. When a plurality of clients accesses one access point simultaneously, arbitration is required, thereby lengthening a communication time. Now, it is assumed that client A performs an automatic process such as a daily computing process and separate client B performs an ordinary office work. For example, from 11:00 p.m to 11:59 daily, a use cost of a relevant wireless LAN port of Client A is lowered to widen a bandwidth while raising a use cost of Client B.

In this example, by employing a time zone as environmental information, it is possible to maintain performance of individual clients in a client environment sharing the wireless LAN in an enterprise. In addition, when a wireless communication traffic monitored by an access point exceeds a predetermined value, a difference in use cost between clients may be provided. For example, by lowering a use cost of a wireless LAN port of an important client while raising a use cost of an ordinary client, it is possible to control a bandwidth between the clients.

A moving notebook PC can access a network such as a wireless LAN or a wireless WAN via access points of different carriers. In general, communication costs are varied depending on access points. In that case, by changing a use cost of a wireless LAN port using an access point identifier obtained from SSID of a beacon, it is possible to save the communication costs. In addition, by changing a use cost for each notebook PC, it is possible to control communication costs of all notebook PCs possessed by an enterprise.

Most of wireless LAN cards equipped in notebook PCs can be used in a frequency band employed with three kinds of standards of IEEE 802.11a/b/c. As theoretical performance, since a bandwidth is the maximum of 11 Mbps in 802.11b and the maximum of 54 Mbps in 802.11a/g, when a wireless LAN card detects an intensity of an electromagnetic wave from SSID of 802.11a/g, the wireless LAN card may be configured to automatically access the access point.

If a microwave oven is near a notebook PC, a 802.11b system and a 802.11g system using a 2.4 GHz band are apt to be affected by noises, which may result in an access error. In this case, by raising a use cost even in case of high intensity of an electromagnetic wave of the 802.11b/g while lowering a use cost of a 802.11a system, it is possible to achieve wireless communication with a low error rate. In addition, in case where an interference is apt to occur due to a large number of accesses to the 802.11a/g system or an electromagnetic wave is weak due to a long distance to an access point, an actual bandwidth of the 802.11b system may be wider than the bandwidth of the 802.11a/g due to occurrence of errors or retry of the 802.11a/g communications. In such a situation, by lowering a performance cost of a wireless LAN port of the 802.11b while raising a performance cost of the 802.11a/g system, a process can easily use the 802.11b system. In these cases, a degree of noise and an error rate can be used as environmental information.

As has been described, the present invention provides a method for managing the usage of hardware resources by application programs within a computer system.

It is also important to note that although the present invention has been described in the context of a fully functional system, those skilled in the art will appreciate that the mechanisms of the present invention are capable of being distributed as a computer program product.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   monitoring a plurality of environmental information associated with a computer system;
   setting a use cost value for a device within said computer system based on said monitored environmental information;
   assigigngng a plurality of applications being executed in said computer system into a first group, a second group and a third group;
   allocating, by a central processor unit, tickets to processes of said applications at respective accumulation rates, wherein the respective accumulation rates are based on the particular group to which the respective applications associated with the respective processes belong, wherein processes of applications in a same group have equal accumulation rates;
   in response to a request by a process to use a device, determining whether or not a number of tickets held by said process is greater than a use cost value currently associated with said requested device; and
   in response to a determination that said number of tickets held by said process is greater than said use cost value currently associated with said requested device, permitting usage of said requested device by said process.

2. The method of claim 1, wherein said environmental information includes remaining capacity of a battery that supplies power to said computer system.

3. The method of claim 2, wherein said setting further includes increasing said use cost value in response to a reduction of said remaining capacity.

4. The method of claim 1, wherein said environmental information setting further includes temperature inside a housing of said computer system.

5. The method of claim 4, wherein said setting further includes increasing said use cost value in response to an increase of said temperature inside said housing.

6. The method of claim 1, wherein said environmental information includes information related to an external power provided to said computer system.

7. The method of claim 1, wherein said setting further includes setting a use cost value for a second device having a higher power consumption than said device.

8. The method of claim 1, wherein said method further includes in response to a determination that said number of tickets held by said process is less than said use cost value currently associated with said requested device, denying usage of said requested device by said process.

9. The method of claim 1, wherein said method further includes subtracting a number of consumed tickets from said number of tickets held by said process immediately after said process has used said requested device.

10. The method of claim 1, wherein processes from applications belonging to said first group receive infinite number of tickets.

11. The method of claim 1, wherein processes from applications belonging to said second group have a higher accumulation rate than processes from applications belonging to said third group.

12. The method of claim 1, wherein processes from applications belonging to said third group have a higher accumulation rate than processes from applications belonging to said second group.

* * * * *